US006653562B2

(12) United States Patent  (10) Patent No.: US 6,653,562 B2
Kochanski et al.  (45) Date of Patent: Nov. 25, 2003

(54) PORTABLE ELECTRICAL UNIT

(75) Inventors: Walter T. Kochanski, Kendallville, IN (US); Frank Roc, Wolcottville, IN (US); Curtis G. Berndt, Fremont, IN (US); Randall L. Bixler, LaGrange, IN (US)

(73) Assignee: Pent Products, Inc., Kendallville, IN (US)

( * ) Notice: Subject to any disclaimer, the term of this patent is extended or adjusted under 35 U.S.C. 154(b) by 0 days.

(21) Appl. No.: 10/273,020

(22) Filed: Oct. 17, 2002

(65) Prior Publication Data
US 2003/0075350 A1 Apr. 24, 2003

Related U.S. Application Data
(60) Provisional application No. 60/330,389, filed on Oct. 18, 2001.

(51) Int. Cl.⁷ .................................................. H02G 3/08
(52) U.S. Cl. .......................... 174/50; 174/48; 220/4.02; 439/535; 248/906
(58) Field of Search ..................... 174/50, 48; 220/4.02, 220/3.8; 439/535; 248/906

(56) References Cited

U.S. PATENT DOCUMENTS

| D180,251 S | 5/1957 | Stiffel ........................ D48/19 |
| 2,925,236 A | 2/1960 | Cook et al. ................. 248/276 |
| 3,072,784 A | 1/1963 | Mann ........................... 240/81 |
| 3,519,293 A | 7/1970 | Henning et al. .............. 287/58 |
| 3,610,884 A | * 10/1971 | Evans et al. ................. 219/439 |
| 3,961,822 A | 6/1976 | Daniel ......................... 297/423 |
| 4,682,452 A | 7/1987 | Propp et al. .................. 52/118 |
| 4,909,405 A | 3/1990 | Kerr, Jr. ....................... 220/3.9 |
| 5,393,026 A | 2/1995 | Deschamps et al. ........ 248/343 |
| 6,077,086 A | 6/2000 | LaRoche ....................... 439/32 |
| 6,133,843 A | * 10/2000 | Davidson ................. 340/693.9 |
| 6,518,500 B1 | * 2/2003 | Huang ......................... 174/50 |
| 6,519,208 B2 | * 2/2003 | DeVries ....................... 368/10 |
| 6,527,135 B1 | * 3/2003 | Braun et al. ............... 220/4.02 |

* cited by examiner

Primary Examiner—Dhiru R Patel
(74) Attorney, Agent, or Firm—Taylor & Aust, P.C.

(57) ABSTRACT

A portable electrical unit including a body, a cavity in the body, a cavity access opening in the body, a door attached to the body for selectively opening and closing said cavity access opening, at least one extensible member slidably received in the body and movable between a retracted position and a range of extended positions for securing the portable electrical unit intermediate a pair of spaced apart surfaces, all of the extensible members being resiliently biased in substantially the same direction and a distribution unit mounted in the body including at least one receptacle. The portable electrical unit may be secured in position intermediate a pair of spaced apart surfaces such as the floor and underside of a desk, or an upper desk or shelf surface and a higher shelf under-surface by one or more extensible members which are slidably received in the body and movable between a retracted position and a range of extended positions.

48 Claims, 12 Drawing Sheets

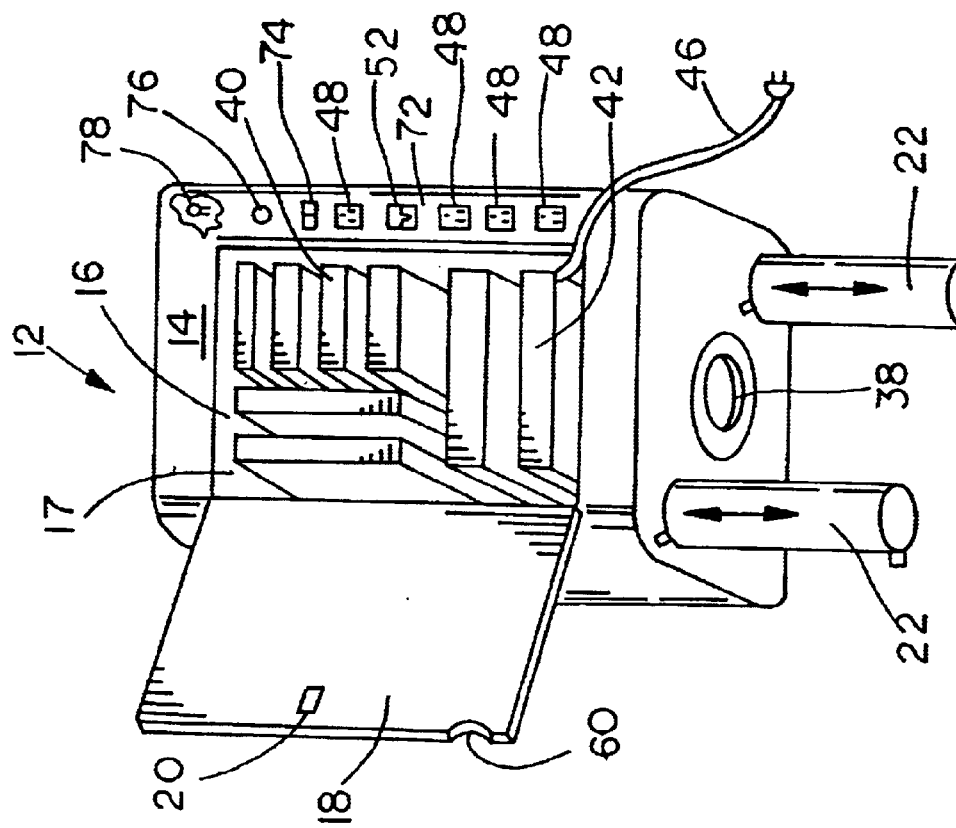
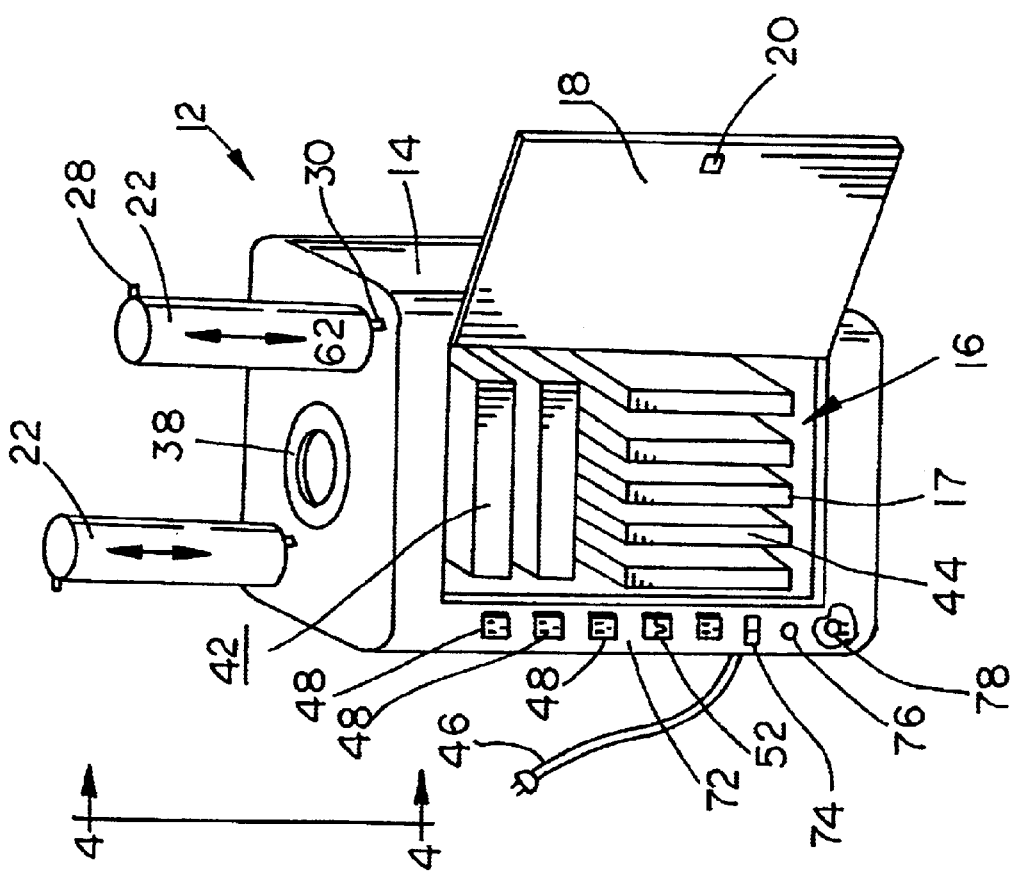

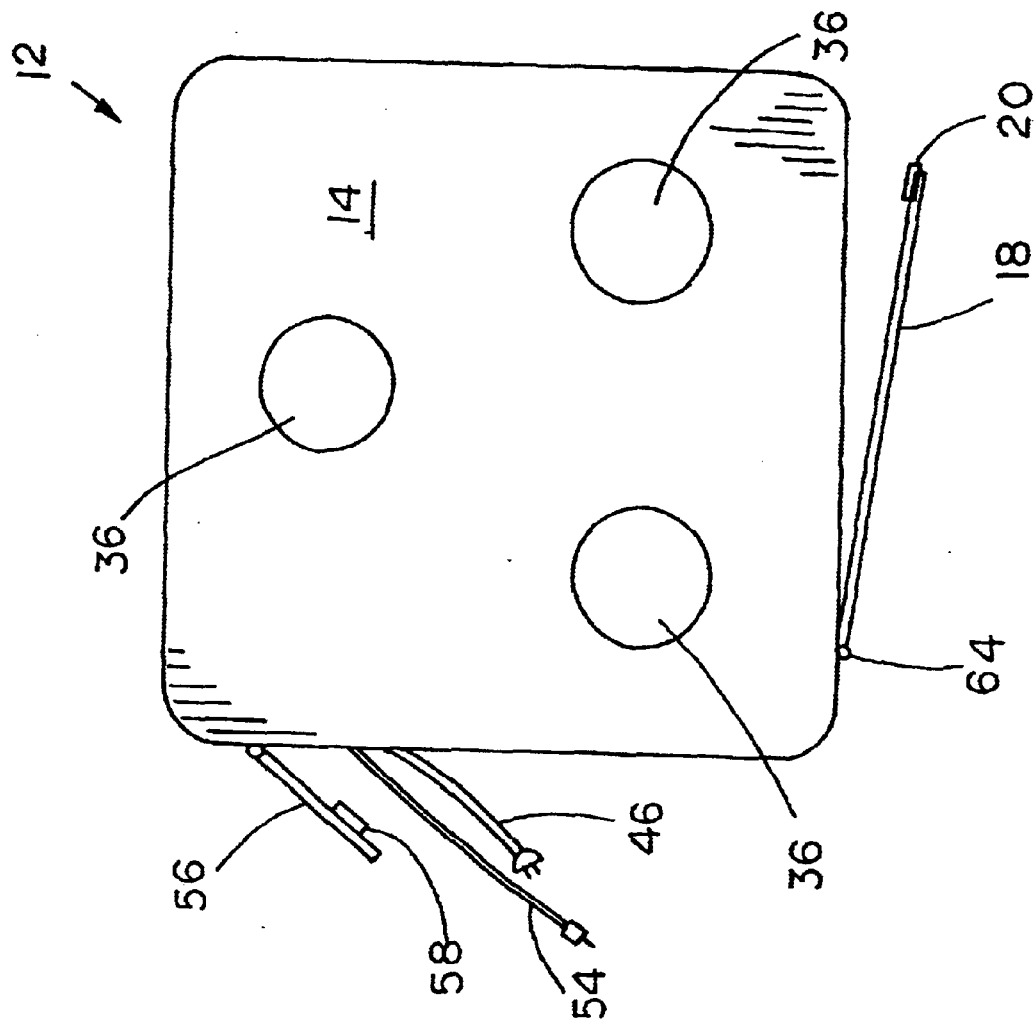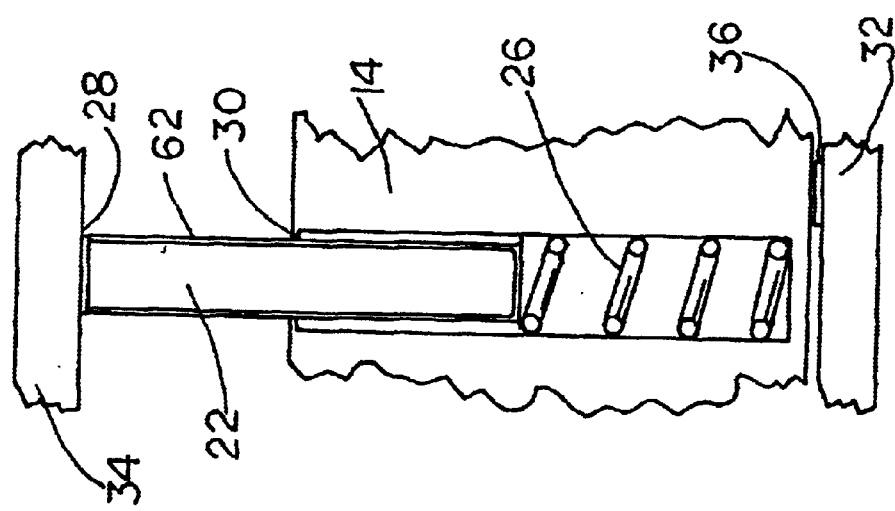

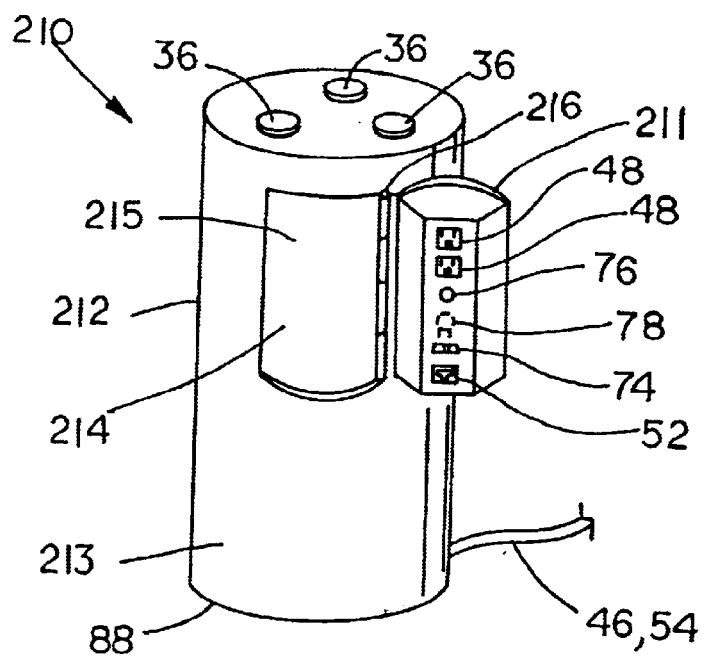
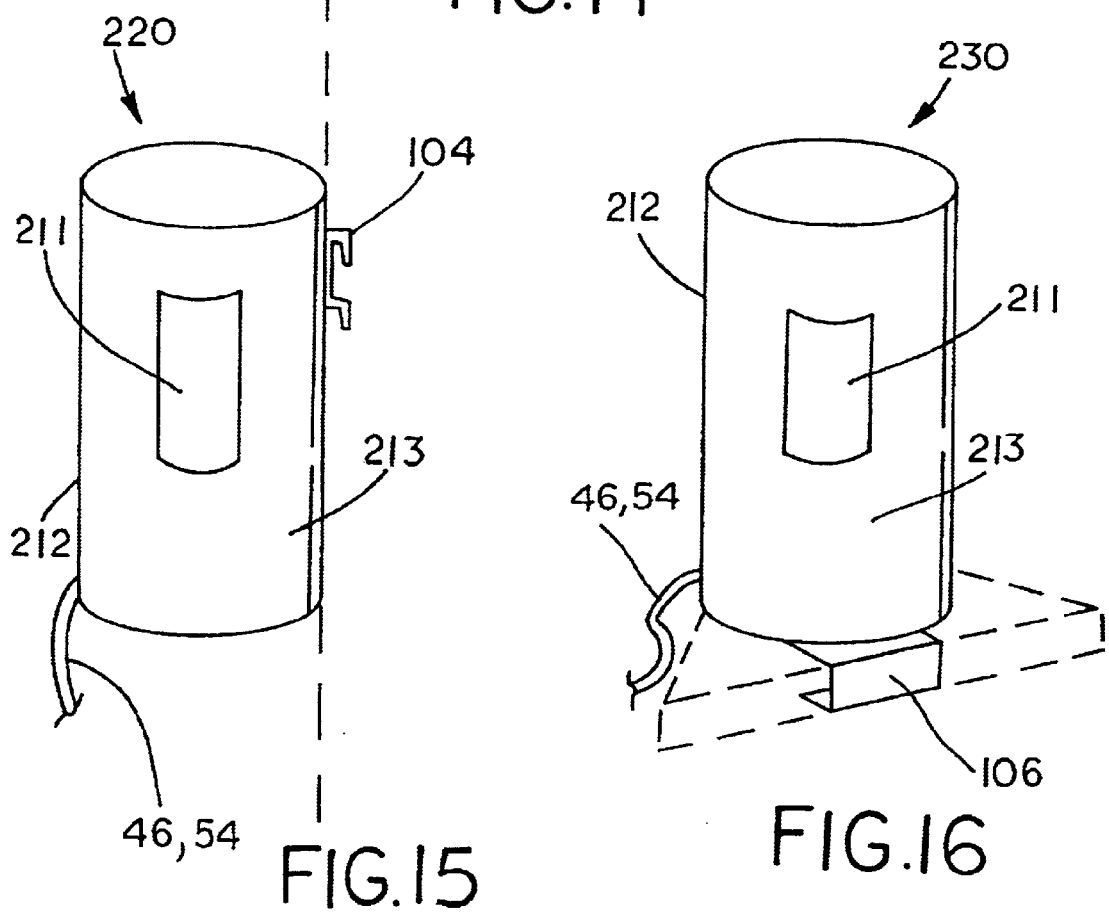

PORTABLE ELECTRICAL UNIT

CROSS REFERENCE TO RELATED APPLICATIONS

This is a non-provisional application based upon U.S. provisional patent application Ser. No. 60/330,389, entitled "ELECTRICAL DEVICE WITH SPRING LOADED HOUSING", filed Oct. 18, 2001.

BACKGROUND OF THE INVENTION

1. Field of the Invention

The present invention relates to modular furniture assemblies and more particularly to a modular furniture accessory providing additional transportable electrical outlets, lighting and communication ports and storage at selected workstations.

2. Description of the Related Art

Modular wall panels, shelving and desks or other workspaces are commonplace in modular office furniture environments. Also common is the need for additional transportable electrical outlets, lighting and communication ports and storage at selected workstations as the need arises do to reconfiguration of the work environment. Additionally, cafeterias, hotel rooms and other suitable spaces are temporarily setup for training purposes, particularly computer based training, by arranging banquet style tables which generally are not adapted for connecting to electrical or electronic devices.

Office desks frequently have a variety of electrical receptacles provided near the desk which are frequently all or nearly all in use. With the proliferation of electronic devices in the workplace, such as laptop and desktop computers and associated peripherals, an already limited electrical receptacle availability is further exacerbated. Further, work groups can be formed for temporary purposes, including training and project teams, which may meet in areas such as conference rooms, cafeterias, break areas and hotel rooms, requiring access to electronic tools including computers wherein the meeting areas do not have workstations available with adequate electrical receptacles, communication ports and lighting. Other tasks requiring powered hand tools similarly require electrical receptacles in areas which may have limited access to the same.

What is needed in the art is a device for providing additional power and communication receptacles, and lighting that is easily configurable, transportable and reconfigurable.

SUMMARY OF THE INVENTION

The present invention provides a portable electrical unit having electrical outlets and communication ports without unnecessarily cluttering desktop areas or otherwise interfering with an efficient office environment.

The invention comprises, in one form thereof, a portable electrical unit including a body, a cavity in the body, a cavity access opening in the body, a door attached to the body for selectively opening and closing said cavity access opening, at least one extensible member slidably received in the body and movable between a retracted position and a range of extended positions for securing the portable electrical unit intermediate a pair of spaced apart surfaces, all of the extensible members being resiliently biased in substantially the same direction and a distribution unit mounted in the body including at least one receptacle. The portable electrical unit may be secured in position intermediate a pair of spaced apart surfaces such as the floor and underside of a desk, or an upper desk or shelf surface and a higher shelf under-surface by one or more extensible members which are slidably received in the body and movable between a retracted position and a range of extended positions.

An advantage of the present invention is that the portable electrical unit may be positioned to provide additional electrical and communication outlets while not interfering with full utilization of the workspace.

Another advantage is the additional electrical and communication outlets may be secured in place yet easily moved to another location without tools.

A further advantage is that easily transportable additional storage may be incorporated into the portable electrical unit combined with the electrical and communication connections.

A yet further advantage is the portable electrical unit can provide additional lighting and heat for a work environment.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is perspective view of an embodiment of a portable electrical unit according to one form of the invention;

FIG. 2 is a perspective view of another embodiment of the portable electrical unit of the present invention similar to FIG. 1;

FIG. 3 is a top view of an embodiment of a portable electrical unit similar to the unit of FIG. 2 showing friction surface pads;

FIG. 4 is a partially cross-sectional view taken along line 4—4 in FIG. 2 showing details of an embodiment of an extensible member of the present invention;

FIG. 14 is a perspective view of an embodiment of the portable electrical unit of the present invention in a surface mount configuration;

FIG. 15 is a perspective view of an embodiment of the portable electrical unit of the present invention in a track mount configuration;

FIG. 16 is a perspective view of an embodiment of the portable electrical unit of the present invention in a table top mount configuration;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 6:
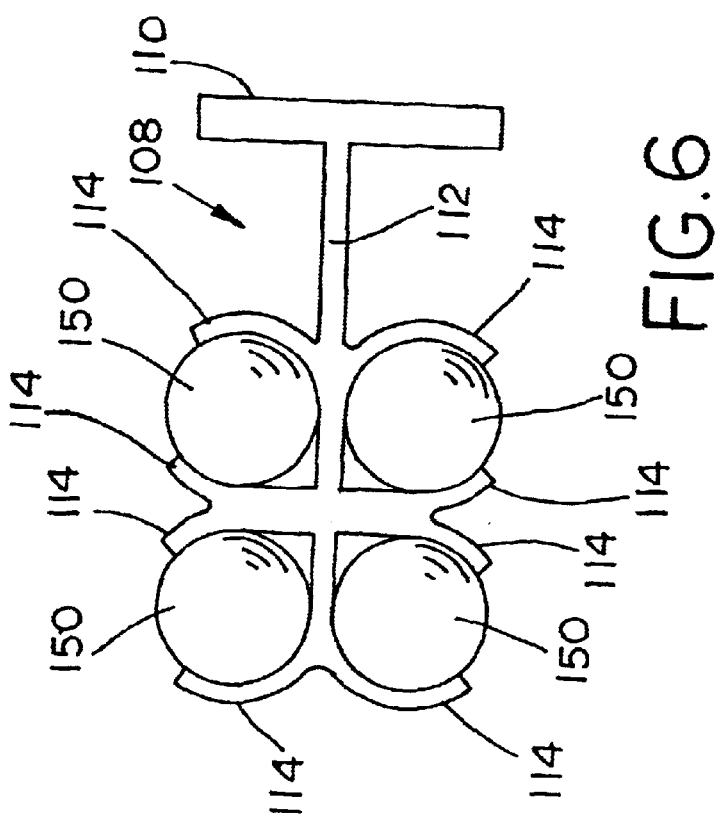
FIG. 6 is a top view of the embodiment of FIG. 6.

Referring now to the drawings, and more particularly to FIG. 1, there is shown a portable electrical unit or housing 12 including a body or first body part 14 and one or more extensible members or second body parts 22. Body 14 has a storage unit cavity 16 for receiving and storing office articles. The articles may be placed in drawers such as 40 and 42, while part of the cavity may provide space for books, files, notebooks, laptop computers and the like as at 44. Numerous other allocations of the space within cavity 16 are possible. There is cavity access opening 17 in body 14 for providing access to cavity 16. Storage unit door 18 is fixed to body 14 for selectively opening and closing cavity access opening 17 by hinge 64 (FIG. 3). Door latch 20 secures door 18 in its closed position.

Portable electrical unit 12 may be secured in position between a pair of spaced apart and/or opposed surfaces by one or more extensible members or legs 22 which are slidably received in body 14 and movable between a retracted position and a range of extended positions for securing unit 12 intermediate a pair of spaced apart, generally parallel, horizontal upper and lower surfaces. The lower surface may, for example, comprise a floor or desk 32 (FIG. 4) and the upper surface may comprise either a desktop or shelf 34 (FIG. 4). Portable electrical unit 12 may be fixed in place with extensible members 22 extending upwardly as in FIG. 1, or with extensible members 22 serving as legs to elevate unit 12 and cavity access opening 17 to a more convenient height as in FIG. 2. Alternatively, portable electrical unit 12 can include a single extensible member or leg 22 or more than two legs 22. Of course, the orientation of the drawer cavities differs between the two views. Extensible members 22 are both resiliently biased in the same direction (upwardly as viewed in FIG. 1) and toward their respective extended positions. The extended positions encompass a range to accommodate various surface spacing. Each extensible member 22 has a movable ram portion 62 which is resiliently biased by spring 26 toward the extended position as shown in FIG. 4. In the retracted position, extensible members 22 lie substantially entirely within the body. Biasing element 26 is shown in FIG. 4 as a coil spring but can also be other spring types such as a leaf or spiral spring, or other biasing elements such as a compressible fluid filled container or a rubber or other resilient material elements, as true with other embodiments.

A leg latch arrangement 28, 30 secures extensible member rams 62 against their respective resilient bias element 26 in the retracted position as best seen by comparing FIGS. 1 and 4. The latching arrangement may include tab 28 which extends radially from ram 62 near the free end thereof. Tab 28 passes through notch or leg latch 30 in the body when ram 62 is in the proper angular orientation and collapsed against biasing element 26 into the body 14. Rotation of ram 62 after tab or leg latch 28 passes through notch 30 locks ram 62 in its retracted position ready for transport. Ram 62 could also be locked in an extended position or held in its retracted position by any suitable selectively engagable friction arrangement. Numerous other suitable locking or latching arrangements are available.

While rounded somewhat at the edges, the storage unit body has the general shape of a rectangular parallelepiped with a pair of opposed faces one of which is visible in FIGS. 1 and 2 and receives extensible members 22, and the other of which is visible in FIG. 3 and is adapted to engage one of the two spaced apart surfaces. As best seen in FIGS. 3 and 4, the surface engaging face may include a friction surface region such as pads 36. A third face, which lies orthogonal to the pair, includes door 18.

Handle 38 which facilitates transportation of the unit from one location to another location is generally annular and hingedly affixed to body 14 along one annulus edge. In the position shown, the handle is nearly flush with or recessed in the body surface, but may be raised and grasped for transporting unit 12 between worksites. Of course, body 14 may be provided with a handle of any desired shape at any selected position or orientation. Alternatively, handle 38 may interconnect the ends of extensible members 22, and also act as a bearing surface when so configured.

Body 14 and/or one or more extensible members 22, forming part of the housing, carry one or more modular electrical units providing portable power, communication and/or light. Each modular electrical unit may be in the form of an electrical power receptacle, a communication port, a light, an on/off switch, a circuit breaker, a surge suppresser, and/or an uninterruptible power supply. In the embodiments described hereinafter, the variously configured modular electrical units carried by the housing are wired using hard wiring or modular connector wiring techniques. However, it is also to be understood that one or more selected modular electrical units carried by a particular housing may communicate via a wireless manner. For example, if the modular electrical unit is in the form of one or more communication ports, such ports may communicate in a wireless manner (e.g., laser, infrared or RF frequency) with other components forming part of the communication system.

One or more electrical power receptacles such as duplex outlets or power receptacles 48 may be mounted in electrical distribution unit or modular electrical unit 72 such as the face containing door 18 and power cord 46 passing through a conventional grommet in another unit wall is available for connecting electrical distribution unit 72 and electrical receptacles 48 and/or communication ports 52 therein, to a source of electrical energy. One or more communication ports 52 with appropriate input wiring, which may be associated with cord 46 or a separate cord such as coaxial or communication connection 54, may also be provided.

Electrical distribution unit 72 may also include on/off switch 74 for disconnecting receptacles 48 and/or communication ports 52 from their source of power or communication, respectively; circuit breaker or fuse 76 for interrupting the circuit in the event of an over current condition; surge suppressor 78 to suppress over voltage conditions; and may also be connected to or combined with an uninterruptible power supply 80 (not shown) in the event of a power outage or brownout conditions.

FIG. 2 illustrates a variation on this concept where the power cord 46 passes through cavity access opening 17 and door 18 includes a notch or cord passing aperture 60 which allows door 18 to be closed with cord 46 extending from cavity opening 17. This variation allows power cord 46 to be conveniently stowed in cavity 16 during transport of unit 12 between worksites.

FIG. 3 carries the concept of cord passing aperture 60 a step further. Power receptacles 58 are now located within body 14, for example, on an inner surface of a second or wiring access door 56. Cord passing apertures 60 in FIG. 2 may be located along the edge of door 56 to allow entry of a power cord 46, a coaxial or other communication connection or cord 54 in the event a communication port mounted interior of unit 12 and passage of equipment power and communication cords 46 and 54, respectively, to connect to the interior receptacles or ports, all while door 56 is closed.

Body 14 and extensible members 22 cooperate to capture unit 12 intermediate the floor and a desk surface or a desk surface and a shelf surface or other spaced apart or opposing surfaces. Extensible members 22 may be compressed into body 14 and latched in position by locking arrangement 28, 30, handle 38 raised and grasped to move unit 12 from one location to another with the contents in tact. Power connection 46 and/or communications connections 54 may be provided outside or within the storage unit. In the event those connections are interior, cord passing apertures 60 along an edge of the a door allow electrical connection to the connectors through the cavity access opening independent of the door position.

Figure 7:
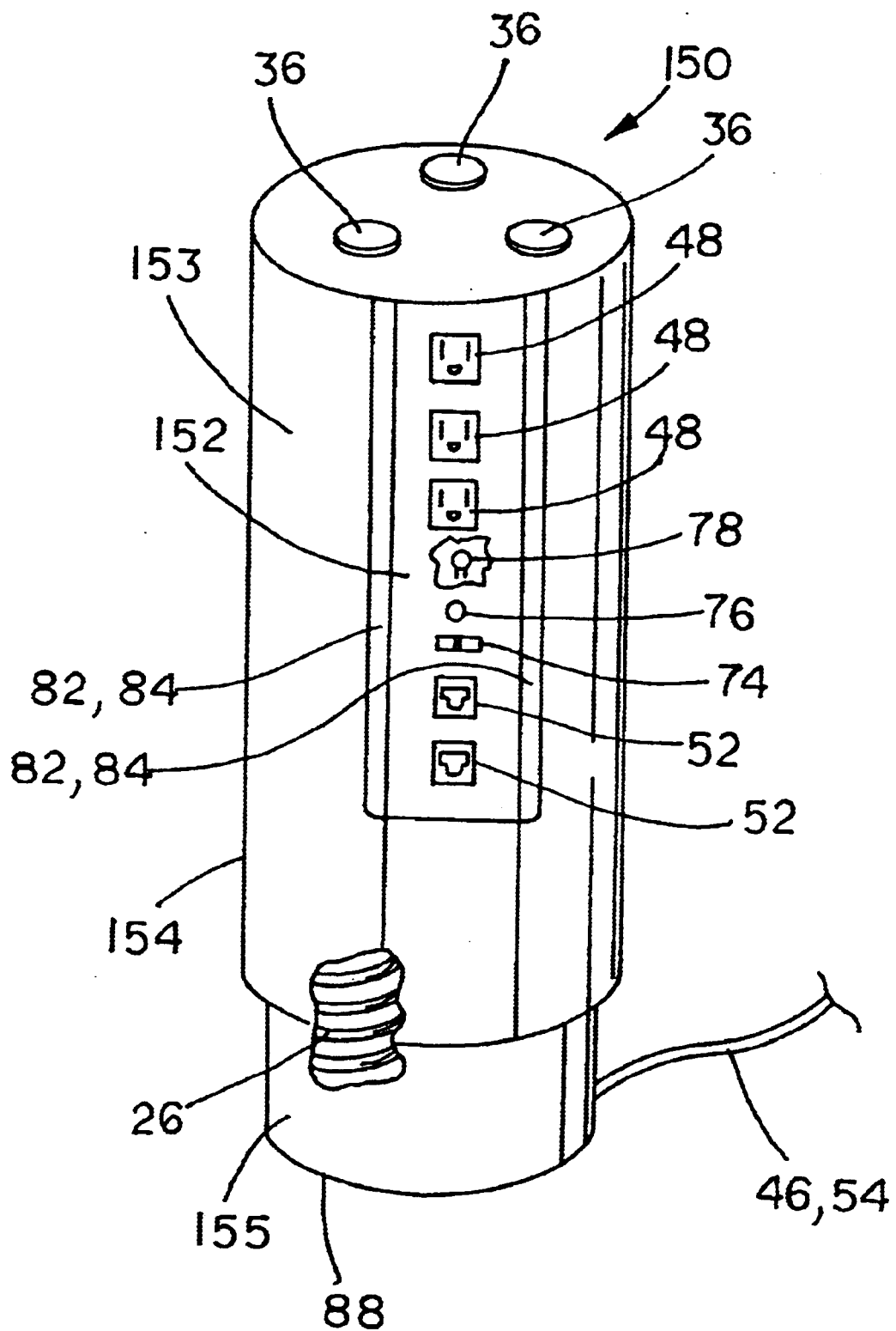
FIG. 7 is a partially fragmentary, perspective view of an embodiment of the portable electrical unit of the present invention.

In other embodiments (FIGS. 7–9), portable electrical units 150, 160 and 170, respectively include a housing or elongate member 153 having male member or second body part 155 slidingly coupled with female member or first body part 154 in a longitudinal direction of elongate member 153. Biasing element 26 is interposed between male member 155 and female member 154 in the longitudinal direction. Biasing element 26 is shown in FIG. 7 as a coil spring but can also be other spring types such as a leaf or spiral spring, or other biasing elements such as a compressible fluid filled container or a rubber or other resilient material elements, as true with other applicable embodiments. Electrical distribution units or modular electrical units 152, 162, 172 are mounted in a respective female member 154 including at least one receptacle 48 and/or communication port 52. Electrical distribution units 152, 162, 172 may also include on/off switch 74 for disconnecting receptacles 48 and/or communication ports 52 from their source of power or communication, respectively; circuit breaker or fuse 76 for interrupting the circuit in the event of an over current condition; surge suppressor 78 to suppress over voltage conditions; and may also be connected to or combined with an uninterruptible power supply (not shown) in the event of a power outage or brownout conditions.

Electrical distribution units 152, 162, 172 are mounted in a respective female member 154 adjacent cord stowage slots 82 which can include cover 84. The combination of cord stowage slots 82 and hollow portion 86 allows cord or cable connections (not shown) connecting into outlets 48 and/or ports 52 proper stowage for the respective cord or cable to maintain a neat and tidy work area.

Power cord 46 connected to a source of power and/or communication cord 54 connected to a communication network are connected to electrical distribution units 152, 162, 172 which allows devices (not shown) connected into electrical distribution units 152, 162, 172 through receptacles 48 and/or communications ports 52 connectivity to the source of power and/or communication network.

Biasing element 26 allows elongate member 153 to be compressed sufficiently to be positioned vertically between two opposing or spaced apart surfaces, such as a floor surface and a worksurface, and at the same time, provide compressive force to facilitate a non-slipping engagement between elongate member 153 and the worksurface and the floor surface sufficient to maintain the vertical positioning of elongate member 153 when loaded with a static loading of plugs and cords, or a dynamic loading of insertion and retraction of cord connected plugs into receptacles 48 and ports 52. Friction surface pads 36 augment the non-slipping engagement between elongate member 153 between two opposing or spaced apart surfaces. Friction surface pads 36 can also be included on bottom 88 of elongate member 153. The two opposing or spaced apart surfaces are not limited a desk surface and floor and can also include any combination of shelve surfaces (horizontal or vertical), computer workstation surfaces, ground and paved surfaces, vehicular surfaces, building surfaces and other surfaces required by the application.

Figure 8:
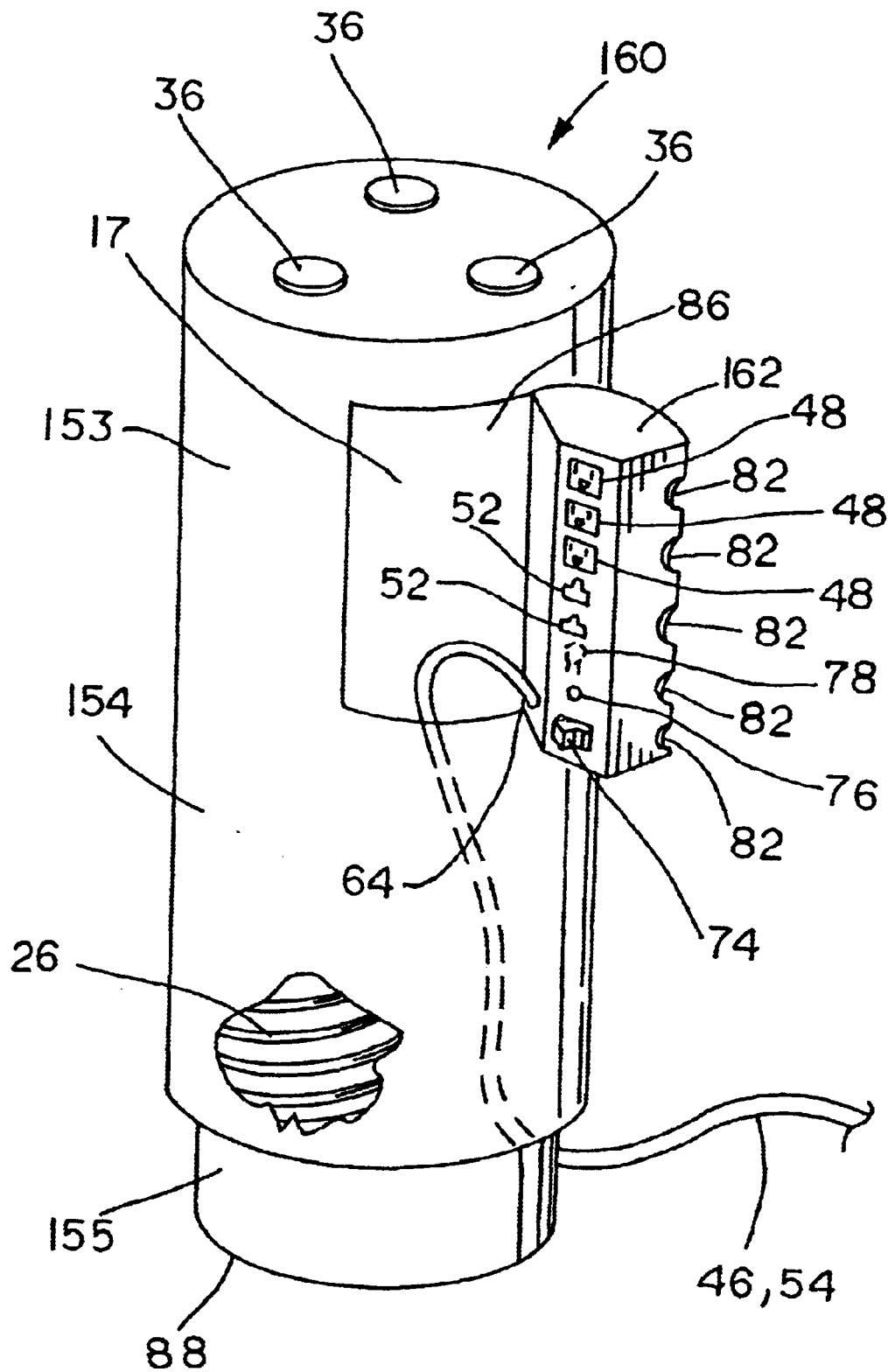
FIG. 8 is a partially fragmentary, perspective view of a variation on the embodiment of the portable electrical unit of FIG. 7.
Figure 9:
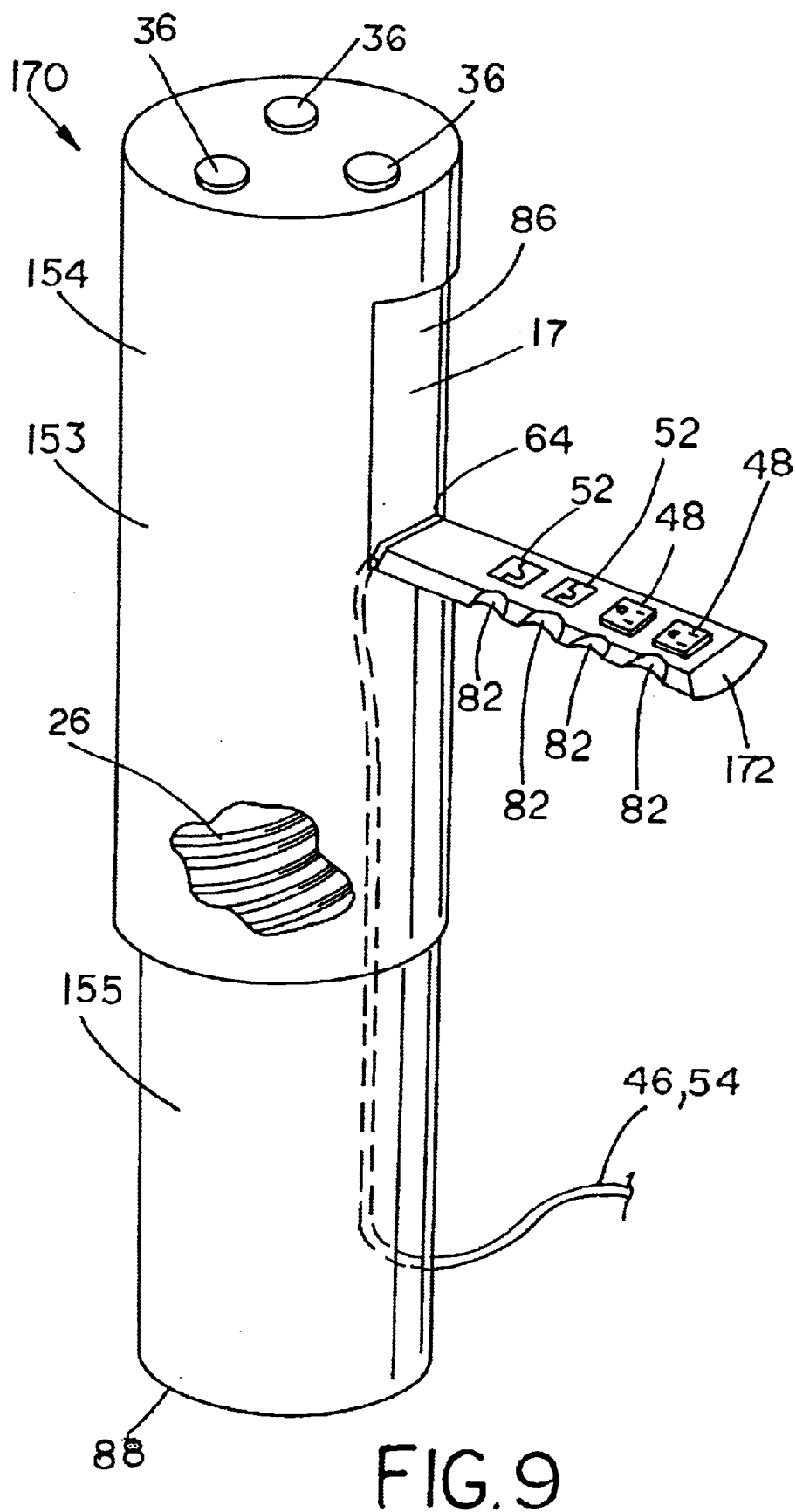
FIG. 9 is a partially fragmentary, perspective view of another variation on the embodiment of the portable electrical unit of FIG. 7.

Electrical distribution unit 152 faces outwardly as in FIG. 7, where electrical distribution units 162, 172 face inwardly as in FIGS. 8 and 9, respectively. When faced inwardly, electrical distribution unit 152 is connected to female member 154 through hinge 64. Electrical distribution units 152, 162, 172 are pivotable about hinge 64 either in a longitudinal rotation (FIG. 8) or a horizontal rotation (FIG. 9).

Figure 10:
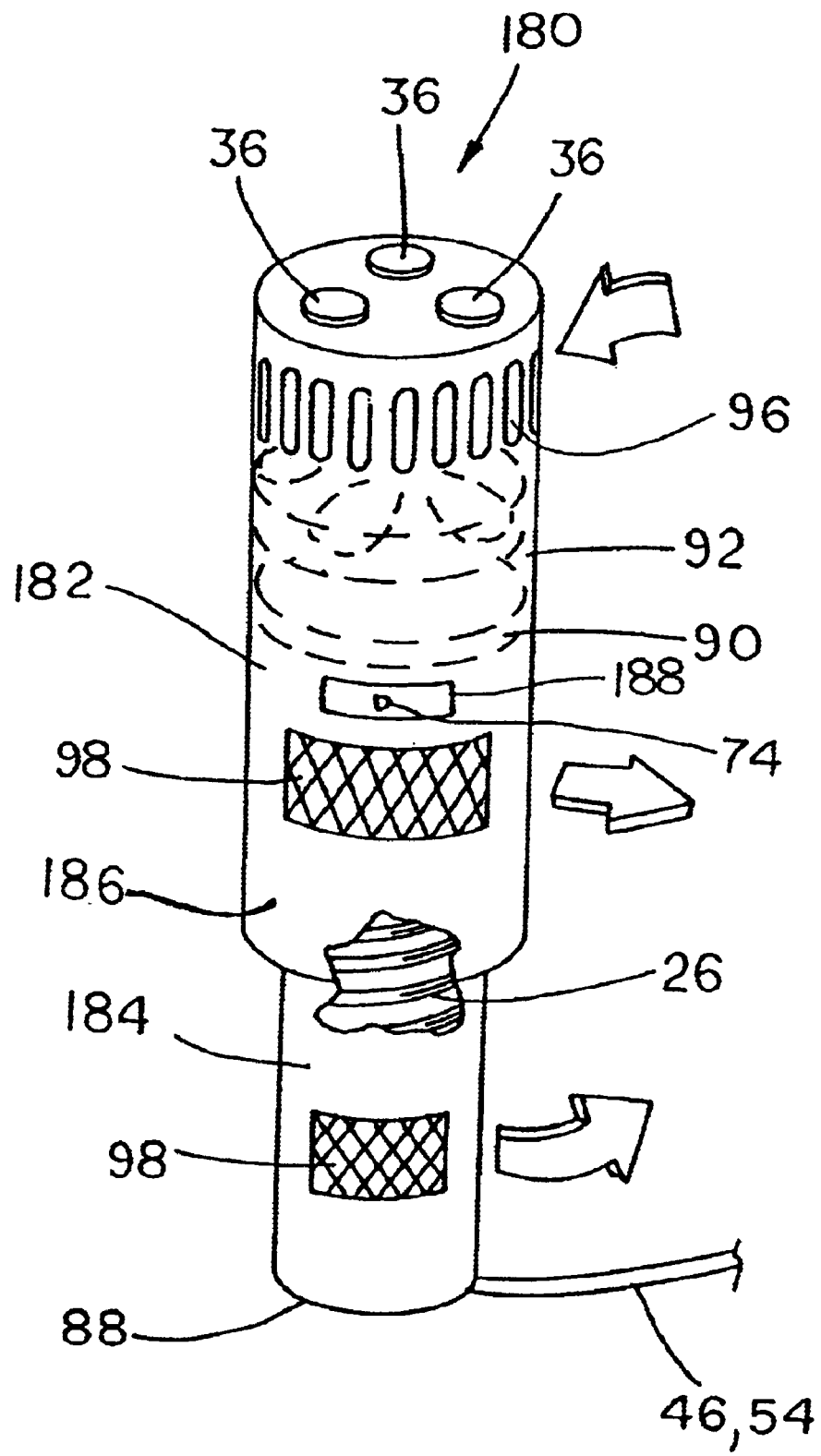
FIG. 10 is a partially fragmentary, perspective view of an embodiment of the portable electrical unit of the present invention incorporating a heater as part of the design.

Another embodiment of portable electrical unit 180 (FIG. 10) employs similar construction as previously described with a housing or elongate member 182 having male member 184 slidingly coupled with female member 186 in a longitudinal direction of elongate member 182. Biasing element 26 is interposed between male member 184 and female member 186 in the longitudinal direction to provide the compressive force necessary to facilitate a non-slipping engagement between elongate member 182 and two opposing or spaced apart surfaces. Power cord 46 connects a source of power (not shown) to fan 92 and heater 90. Fan 92 draws ambient air through cold air vents 96 and fan 92, over heater 90 and out heated air vents 98. Enhanced safety is achieved through the lesser likelihood of portable electrical unit 180 being tipped over and coming into contact with flammable materials, the lesser likelihood of tipping being a direct result of biasing element 26 providing the compressive force necessary to facilitate a non-slipping engagement between elongate member 182 and two opposing or spaced apart surfaces.

Electrical distribution unit or modular electrical unit 188 may also include on/off switch 74 for disconnecting receptacles 48 and/or communication ports 52 from their source of power or communication, respectively; circuit breaker or fuse 76 for interrupting the circuit in the event of an over current condition; surge suppressor 78 to suppress over voltage conditions; and may also be connected to or combined with an uninterruptible power supply (not shown) in the event of a power outage or brownout conditions.

Figure 11:
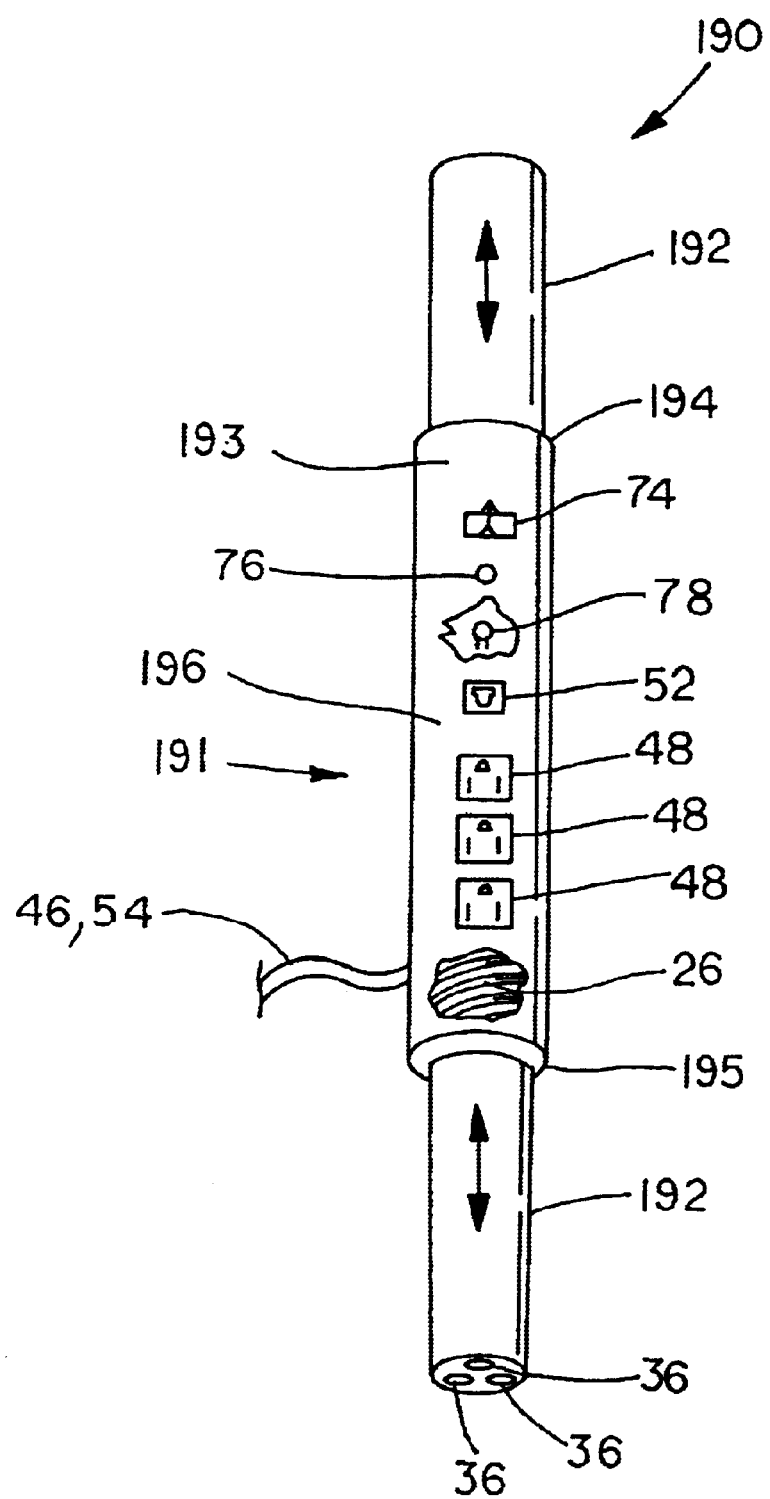
FIG. 11 is a partially fragmentary, perspective view of an embodiment of the portable electrical unit of the present invention incorporating dual longitudinal extensible members.

In other embodiments (FIGS. 11–13) of portable electrical 190, 200, housing or elongate member 191, 201 has two male members or second body parts 192 slidingly coupled with female member or first body parts 193, 202 in a longitudinal direction of elongate member 191, 201, a first male member 192 slidingly coupled to a first end 194 of female member 193, 202 and a second male member 192 slidingly coupled to a second end 195 of female member 193, 202. At least one biasing element 26 interposed between two male members 192 and the female member 193, 202 in the longitudinal direction provides the compressive force necessary to facilitate a non-slipping engagement between elongate member 191, 201 and two opposing or spaced apart surfaces, and provide biasing of each male member in an opposite longitudinal direction. Electrical distribution units or modular electrical units 196, 204 is mounted in female member 193, 202 and includes at least one receptacle 48 and/or communication port 52. Electrical distribution units 196, 204 may also include on/off switch 74 for disconnecting receptacles 48 and/or communication ports 52 from their source of power or communication, respectively; circuit breaker or fuse 76 for interrupting the circuit in the event of an over current condition; surge suppressor 78 to suppress over voltage conditions; and may also be connected to or combined with an uninterruptible power supply (not shown) in the event of a power outage or brownout conditions.

Power cord 46 connected to a source of power and/or communication cord 54 connected to a communication network are connected to electrical distribution units 196, 204 which allows devices (not shown) connected into electrical distribution units 196, 204 through receptacles 48 and/or communications ports 52 connectivity to the source of power and/or communication network.

Figure 12:
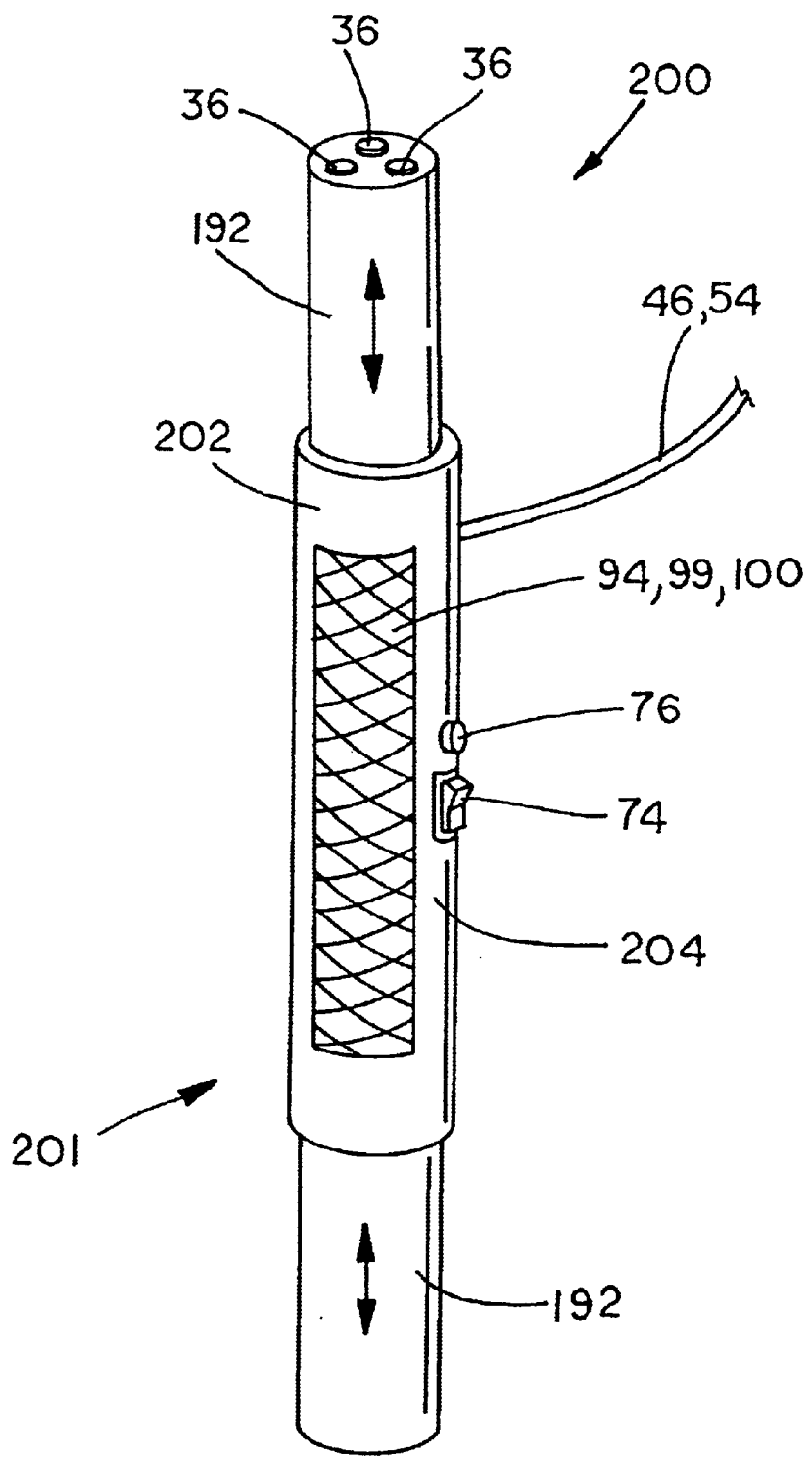
FIG. 12 is a perspective view of an embodiment of the portable electrical unit of the present invention similar to the embodiment of FIG. 11 incorporating a light as part of the design.
Figure 13:
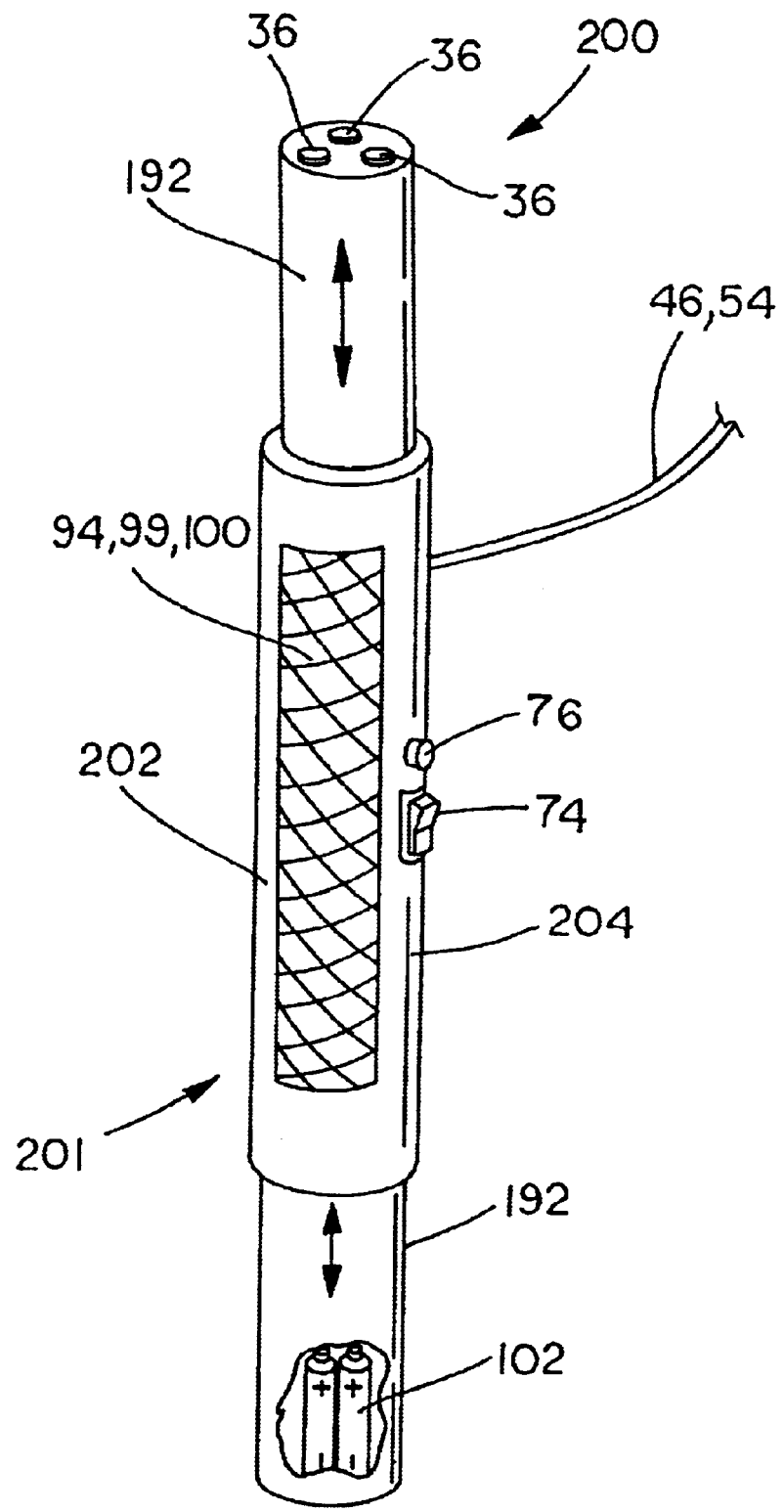
FIG. 13 is a partially fragmentary, perspective view of an embodiment of the portable electrical unit of the present invention similar to the embodiment of FIG. 12 further incorporating a rechargeable battery to energize the light.

FIGS. 12 and 13 show embodiments of portable electrical unit 200 wherein the electrical distribution unit is replaced by light 100, which can include lens 94 and reflector 99, connected to a source of power through switch 74 and power cord 46. Optionally light 100 can be in addition to electrical distribution unit 204. Battery pack 102 can be optionally included to provide power. Battery pack 102 can be a rechargeable battery pack. As previously noted friction surface pads 36 can be placed at the ends of elongate member 201.

Embodiments of portable electrical units 210, 220, 230 not requiring "pogo" style mounting are shown in FIGS. 14–16. Electrical distribution unit or modular electrical unit 211 is connected to body 212 of elongate member 213 through hinge 216, and provides access to cavity 215. Electrical distribution unit 211 includes at least one receptacle 48 and/or communication port 52. Electrical distribution unit 211 may also include on/off switch 74 for disconnecting receptacles 48 and/or communication ports 52 from their source of power or communication, respectively; circuit breaker or fuse 76 for interrupting the circuit in the event of an over current condition; surge suppressor 78 to suppress over voltage conditions; and may also be connected to or combined with an uninterruptible power supply (not shown) in the event of a power outage or brownout conditions.

Body 212 can include cord stowage slots 82 and cover 84 adjacent electrical distribution unit 211. The combination of cord stowage slots 82 and hollow portion 86 allows cord or cable connections (not shown) connecting into outlets 48 and/or ports 52 proper stowage for the respective cord or cable to maintain a neat and tidy work area.

Power cord 46 connected to a source of power and/or communication cord 54 connected to a communication network are connected to electrical distribution unit 211, and receptacles 48 and ports 52, which allows devices (not shown) connected into electrical distribution unit 211 through receptacles 48 and/or communications ports 52 connectivity to the source of power and/or communication network.

Portable electrical units 210, 220, 230 of FIGS. 14–16 are simply placed on a surface, or optionally, are mounted on a modular furniture or other slotted track using track mount 104 connected to body 212. Another mounting option is table top mount 106 connected to body 212. Portable electrical units 210, 220, 230 can be attached to surfaces using conventional elements such as screws, nuts and bolts, adhesives, and other elements well known in the art. Other appropriate features as previously described in other embodiments can be applied. Hollow portion 214 having cavity 215 can be used for miscellaneous strorage.

Elongate member 213 is shown in FIGS. 14–16 as having a circular cross-section as is elongate member 213 and extensible members 22 and 24 in other embodiments, however, other cross-sectional shapes such as elliptical, square, rectangular, polygonal and other eclectic shapes are possible.

In use, portable electrical unit 12 is positioned for use by compressing extensible members or elongate members and placing portable electrical unit 12 between opposing or spaced apart surfaces. Extensible members or elongate members are than released firmly locating portable electrical unit 12 at the desired location. For the embodiments of FIGS. 14–16, portable electrical units 210, 220, 230 are placed on a surface or mounted using track mount 104 or table top mount 106. For all embodiments cords 46 and 54 connect to sources of power and communications, respectively, causing receptacles 48 and ports 52 to be "live". Devices (not shown), such as desktop and laptop computers, heaters, lights, electronic devices, radios, television receivers, projectors, power tools, chargers, electric compressors and power washers and other devices requiring either electric or communication connectivity, are connected to receptacles 48 and/or ports 52 and used. After use, and if desired, portable electrical unit 12 can be removed, through the reverse action of mounting, and remounted as required in another work area or stored for later use.

Figure 5:
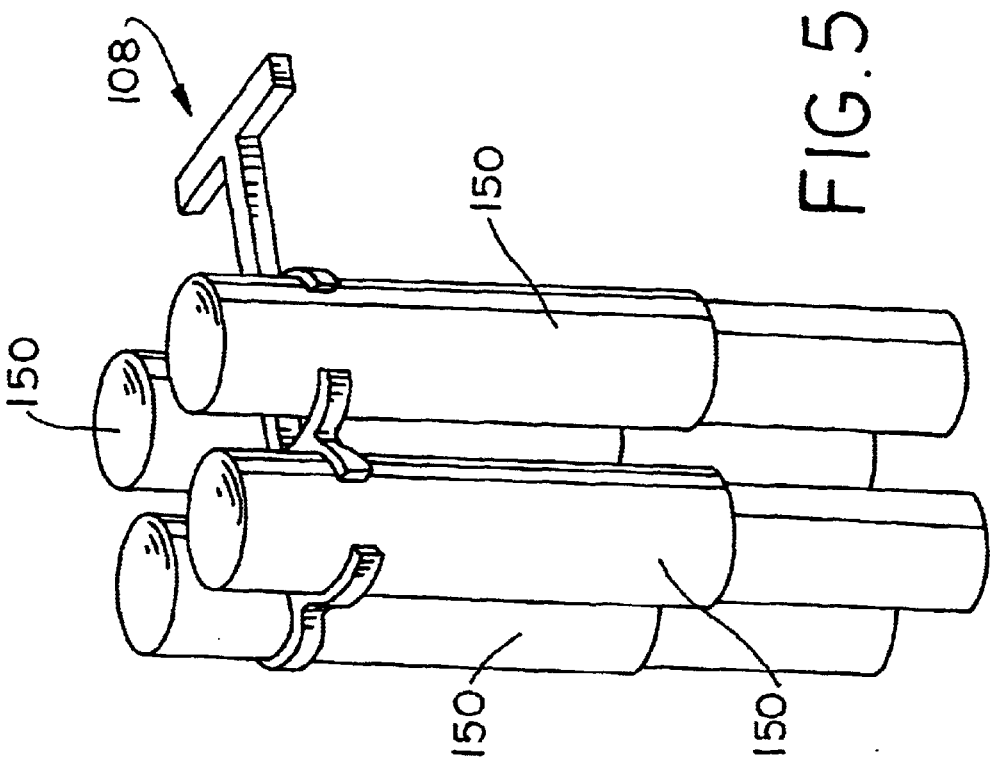
FIG. 5 is a perspective view of an embodiment of the carrier of the present invention shown conjuctively with four portable electrical unit of the present invention.

Carrier 108 (FIGS. 5–6) allows organizing and carrying a plurality of portable electrical units 150, or other embodiments of the present invention, when not in use or for convenient storage. Carrier 108 includes handle 110, stem 112 connected to handle 110, handle 110 perpendicular to a longitudinal axis of stem 112 and a plurality of clasps 114 connected to stem 112. In use, portable electrical units 150 are placed in clasps 114 to allow for convenient storage and carrying, or when close proximity is required when using portable electrical units 150, carrier 108 can hold units 150 in an organized and fixed relation way.

Figure 17:
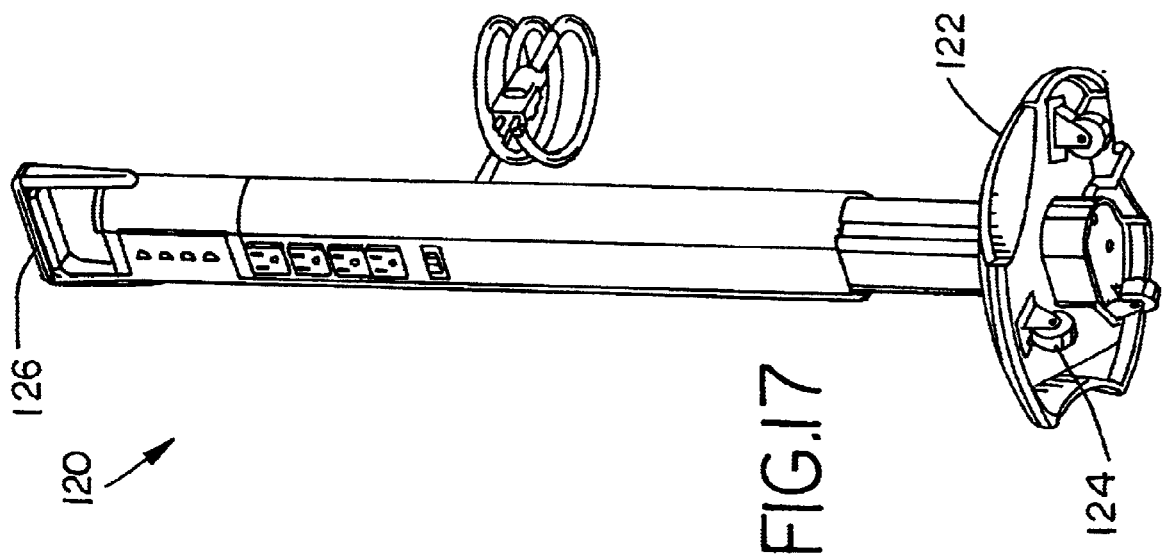
FIG. 17 is a perspective view of yet another embodiment of a portable electrical unit of the present invention.

FIG. 17 illustrates another embodiment of a portable electrical unit 120 of the present invention, including a base 122 supporting a plurality of wheels 124. A pivotable handle 126 at the top of portable electrical unit 120 allows a user to wheel portable electrical unit 120 from one location to another.

Figure 18:
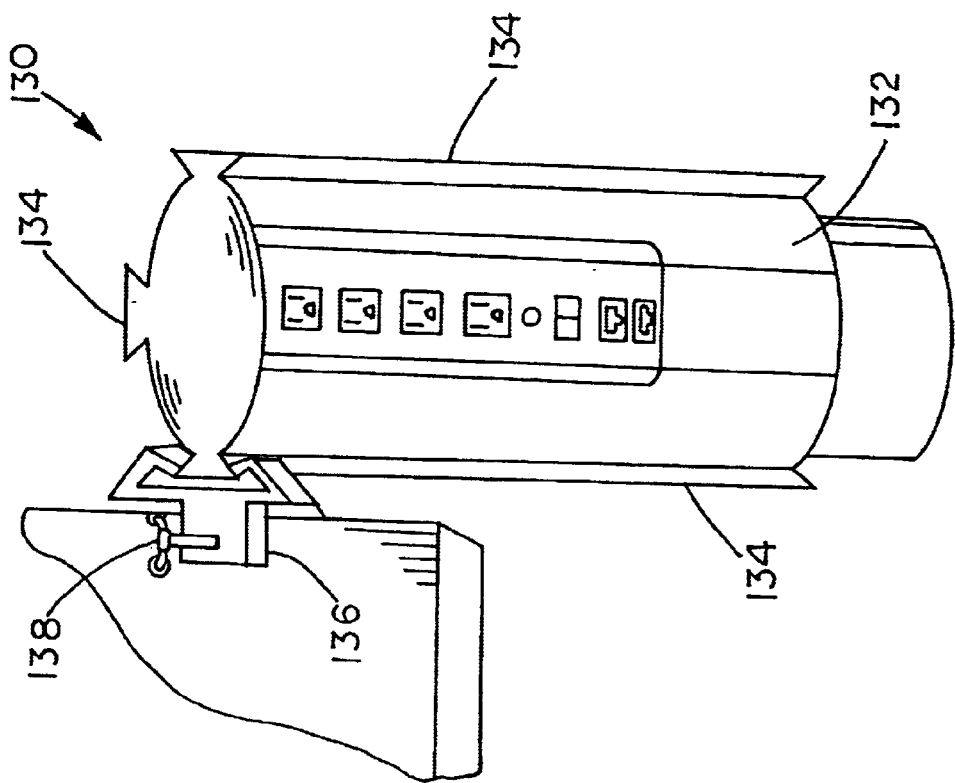
FIG. 18 is a perspective view of a further embodiment of a portable electrical unit of the present invention attached to a work surface.

FIG. 18 illustrates yet another embodiment of a portable electrical unit 130 having a female elongate member 132 with a plurality of vertically oriented tracks 134 which are configured to selectively engage a work surface mount 136. Work surface mount 136 is engaged with the work surface without the use of tools, such as by using thumb screw 38. Of course, the actual geometry of track 134 and interconnection with work surface mount 136 may vary, depending on the application.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A portable electrical unit, comprising:

a body;

a cavity in said body;

a cavity access opening in said body;

a door attached to said body for selectively opening and closing said cavity access opening;

at least one extensible member slidably received in said body and movable between a retracted position and a range of extended positions for securing the portable electrical unit intermediate a pair of spaced apart surfaces, all said at least one extensible member being resiliently biased; and an electrical distribution unit mounted in said body.

2. The portable electrical unit of claim 1, further including at least one of an on/off switch, a circuit breaker, a surge suppressor and an uninterruptible power supply electrically connected to said electrical distribution unit.

3. The portable electrical unit of claim 1, further including at least one cord electrically connected to said electrical distribution unit and at least one receptacle mounted in said electrical distribution unit.

4. The portable electrical unit of claim 1, wherein said electrical distribution unit includes at least one power receptacle and at least one communication port.

5. The portable electrical unit of claim 4, further including at least one cord electrically connected to said electrical distribution unit and at least one said power receptacle.

6. The portable electrical unit of claim 5, wherein said at least one cord includes at least one communication connection electrically connected to said at least one communication port and at least one power cord electrically connected to said at least one power receptacle.

7. The portable electrical unit of claim 1, wherein said at least one extensible member is resiliently biased toward said extended positions.

8. The portable electrical unit of claim 1, further including a latch arrangement for securing said extensible member against said resilient bias in said retracted position.

9. The portable electrical unit of claim 1, wherein said body has a general shape of a rectangular parallelepiped with a pair of opposed faces, one of said faces receiving said extensible member and an other face adapted to engage one of two spaced apart surfaces.

10. The portable electrical unit of claim 9, wherein said other face includes at least one of a friction surface pad for engaging one of said two spaced apart surfaces.

11. The portable electrical unit of claim 1, wherein in said retracted position, said extensible member lies substantially entirely within said body.

12. The portable electrical unit of claim 1, further including a handle for facilitating transportation of said unit from one location to another location.

13. The portable electrical unit of claim 1, further comprising a cord passing notch along an edge of said door.

14. A portable electrical unit, comprising:

an elongate member including a male member slidingly coupled with a female member in a longitudinal direction of said elongate member, a biasing element interposed between said male member and said female member in said longitudinal direction;

an electrical distribution unit in said elongate member; and at least one cord electrically connected to said distribution unit.

15. The portable electrical unit of claim 14, further including at least one receptacle in said electrical distribution unit, said electrical distribution unit is mounted wherein said at least one receptacle faces external said hollow portion.

16. The portable electrical unit of claim 14, wherein said female member includes an access opening, said electrical distribution unit is hingedly attached to said female member at said access opening.

17. The portable electrical unit of claim 14, wherein said elongate member includes a first longitudinal end and a second longitudinal end, at least one friction pad is located at at least one of said first end and said second end.

18. The portable electrical unit of claim 14, further including a fan and a heater electrically connected to said cord, at least one cold air vent in said elongate member and at least one heated air vent in at least one of said female member and said male member.

19. The portable electrical unit of claim 14, wherein said electrical distribution unit includes at least one power receptacle and at least one communication port.

20. The portable electrical unit of claim 19, wherein said at least one cord includes at least one communication connection electrically connected to said at least one communication port and at least one power cord electrically connected to said at least one power receptacle.

21. The portable electrical unit of claim 19, further including at least one of an on/off switch, a circuit breaker, a surge suppressor and an uninterruptible power supply electrically connected to said electrical distribution unit.

22. The portable electrical unit of claim 14, further including at least one cord stowage slot in said female member adjacent said electrical distribution unit.

23. The portable electrical unit of claim 14, further including including two male members slidingly coupled with a female member in a longitudinal direction of said elongate member, a first said male member slidingly coupled to a first end of said female member, and a second male member slidingly coupled to a second end of said female member, at least one biasing element interposed between said two male members and said female member in said longitudinal direction.

24. The portable electrical unit of claim 23, further including at least one light in said elongate member, said light electrically connected to at least one said cord.

25. The portable electrical unit of claim 24, further including a battery in said elongate member, said battery is electrically connected to at least one said cord and at least one said light.

26. The portable electrical unit of claim 25, wherein said battery is a rechargeable battery.

27. The portable electrical unit of claim 25, wherein said electrical distribution unit is mounted so that said at least one receptacle faces external said hollow portion.

28. The portable electrical unit of claim 23, further including an access opening in said female member, said electrical distribution unit being attached to said female member at said access opening.

29. The portable electrical unit of claim 23, wherein said elongate member includes a first longitudinal end and a second longitudinal end, at least one friction pad is located at at least one of said first end and said second end.

30. The portable electrical unit of claim 23, wherein said at least one receptacle includes at least one power receptacle and at least one communication port.

31. The portable electrical unit of claim 23, wherein said at least one cord includes at least one communication connection electrically connected to said at least one communication port and at least one power cord electrically connected to said at least one power receptacle.

32. The portable electrical unit of claim 23, further including at least one of an on/off switch, a circuit breaker, a surge suppressor and an uninterruptible power supply electrically connected to said electrical distribution unit.

33. The portable electrical unit of claim 23, further including at least one cord stowage slot in said female member adjacent said electrical distribution unit.

34. A portable electrical unit, comprising:
   a housing including a first body part and a second body part, said second body part slidably received within said first body part;
   a biasing element interposed between said first body part and said second body part for biasing said first body part and said second body part away from each other; and
   a modular electrical unit carried by said housing.

35. The portable electrical unit of claim 34, wherein said second body part part comprises an extensible member.

36. The portable electrical unit of claim 34, wherein said first body part comprises a female elongate member and said second body part comprises a male elongate member slidably received within said female elongate member.

37. The portable electrical unit of claim 34, wherein each of said male elongate member and said female elongate member are generally cylindrical in shape.

38. The portable electrical unit of claim 34, wherein at least one of said first body part and said second body part includes a storage cavity.

39. The portable electrical unit of claim 38, wherein said housing includes an access opening in communication with said storage cavity.

40. The portable electrical unit of claim 39, wherein said housing further includes a door selectively covering said access opening.

41. The portable electrical unit of claim 34, wherein each said modular electrical unit comprises one of an electrical power receptacle, a communication port, a light, an on/off switch, a circuit breaker, a surge suppressor, and an uninterruptible power supply.

42. The portable electrical unit of claim 34, further including a worksurface mount connected to said housing.

43. The portable electrical unit of claim 42, wherein said housing includes a track arrangement coupled with said work surface mount.

44. The portable electrical unit of claim 34, further including at least one transport wheel carried by said housing.

45. The portable electrical unit of claim 34, wherein said housing includes an end and at least one friction pad located at said end.

46. The portable electrical unit of claim 34, further including at least one electrical cord, each said electrical cord being connected with at least one said modular electrical unit.

47. A portable electrical unit system, said system comprising:
   at least one portable electrical unit, comprising:
      an elongate member including a female member and a male member, said male member slidably received within said female member;
      a biasing element interposed between said male member and said female member for biasing said male member and said female member away from each other; and
      at least one modular electrical unit, said at least one modular electrical unit being carried by a corresponding one of said male member and said female member; and
   a carrier for organizing and carrying said portable electrical units comprising:
      a stem, and
      a plurality of clasps extending from said stem, each said clasp being configured to receive a corresponding said elongate member therein.

48. The portable electrical unit system of claim 47, further including a handle connected to said stem.

* * * * *